United States Patent
Wu

(10) Patent No.: US 10,962,405 B2
(45) Date of Patent: Mar. 30, 2021

(54) MODIFYING AN ELECTRONIC DEVICE TO WEIGH A LOAD SUSPENDED THEREFROM

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Wen-Bing Wu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 175 days.

(21) Appl. No.: 16/257,462

(22) Filed: Jan. 25, 2019

(65) Prior Publication Data
US 2020/0200588 A1    Jun. 25, 2020

(30) Foreign Application Priority Data
Dec. 25, 2018   (CN) .......................... 201811595530.X

(51) Int. Cl.
| G01G 19/52 | (2006.01) |
| G01G 19/18 | (2006.01) |
| G01G 3/12 | (2006.01) |
| G01G 21/23 | (2006.01) |
| G01G 23/37 | (2006.01) |

(52) U.S. Cl.
CPC .............. *G01G 19/52* (2013.01); *G01G 3/12* (2013.01); *G01G 19/18* (2013.01); *G01G 21/23* (2013.01); *G01G 23/3707* (2013.01)

(58) Field of Classification Search
CPC .......... G01G 3/12; G01G 19/52; G01G 21/23; G01G 23/3707; G01G 19/18
See application file for complete search history.

(56) References Cited

U.S. PATENT DOCUMENTS

| 4,660,666 | A | * | 4/1987 | Reder | .................. G01G 3/1402 177/126 |
| 4,771,640 | A | * | 9/1988 | Matsuura | .................. G01L 1/24 250/227.29 |
| 4,936,399 | A | * | 6/1990 | Christman | ............... G01G 3/12 177/148 |
| 6,166,336 | A | * | 12/2000 | Odiet | .................... G01L 1/2243 177/154 |
| 7,886,442 | B2 | * | 2/2011 | Camenzind | ............... B25F 1/00 30/151 |

\* cited by examiner

*Primary Examiner* — Randy W Gibson
(74) *Attorney, Agent, or Firm* — ScienBiziP, P.C.

(57) ABSTRACT

A weighing device includes a weighing module, a processor, and an output device. The weighing module includes a suspension component, a deformation component, and a sensor. The deformation component includes an elastic piece, a connecting portion, and a fixing portion. The elastic piece is coupled between the connecting portion and the fixing portion. The suspension component includes a hook and a lanyard. One end of the lanyard is fixed to the connecting portion, and a second end of the lanyard is passed through the fixing portion and coupled to the hook. When the hook suspends an object to be weighed, the hook moves the connecting portion toward the fixing portion and deforms the elastic piece. The sensor detects a deformation amount of the elastic piece. The processor calculates a weight of the object according to the deformation amount and an elastic coefficient of the elastic piece.

14 Claims, 3 Drawing Sheets

MODIFYING AN ELECTRONIC DEVICE TO WEIGH A LOAD SUSPENDED THEREFROM

FIELD

The subject matter herein generally relates to electronic devices, and more particularly to an electronic device including a weighing device.

BACKGROUND

In daily life, objects that need to be weighed are weighed on a scale. However, conventional weighing devices are generally inconvenient to carry and have poor accuracy. In addition, a display of the scale may be obstructed by the object, which makes it difficult to read a weight of the object.

BRIEF DESCRIPTION OF THE DRAWINGS

Implementations of the present disclosure will now be described, by way of embodiments, with reference to the attached figures.

DETAILED DESCRIPTION

Figure 1:
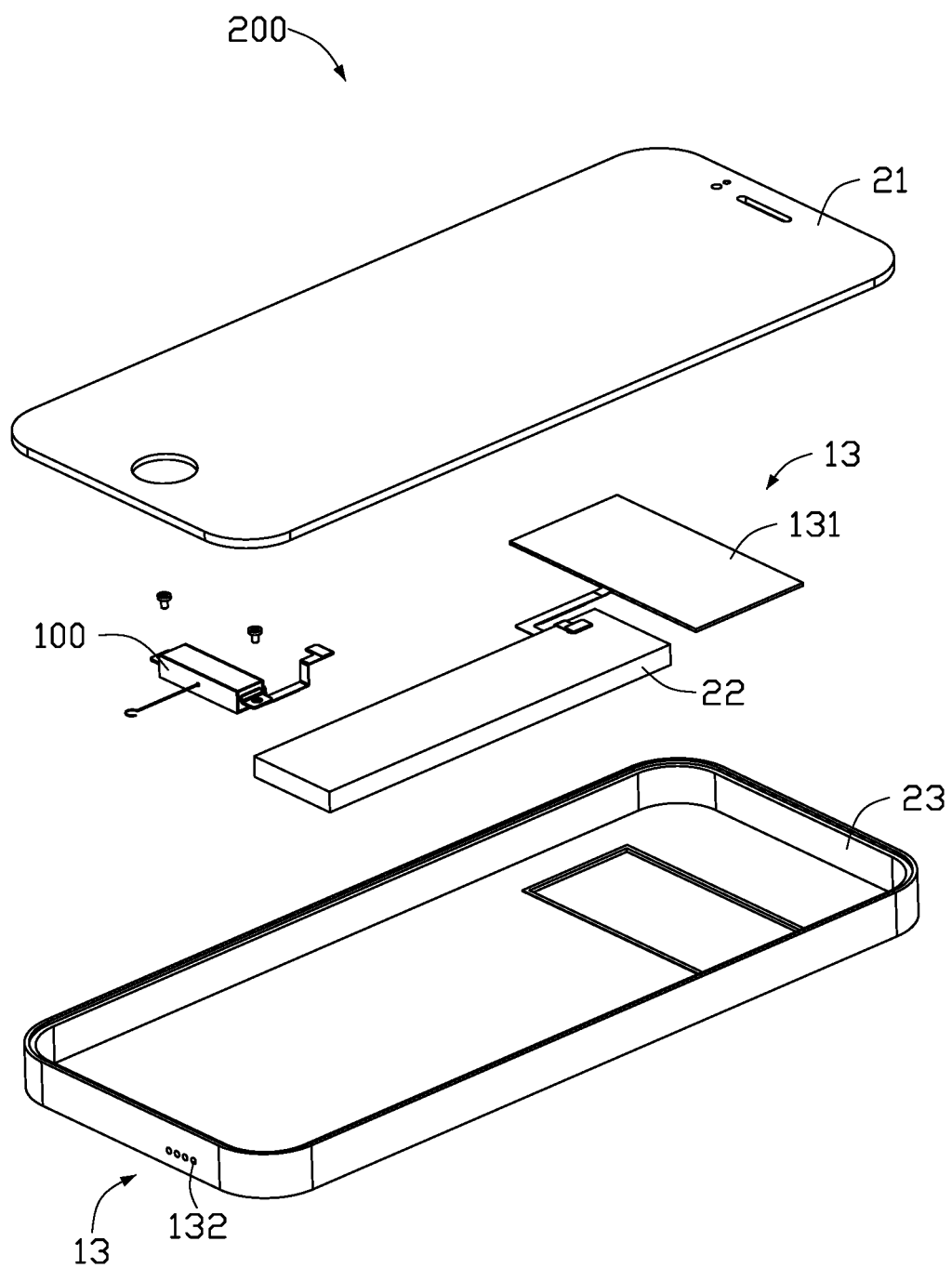
FIG. 1 is an exploded, isometric view of an embodiment of an electronic device having a weighing device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 shows an embodiment of an electronic device 200 including a weighing device 100. The electronic device 200 may be a mobile phone, a tablet computer, an electronic delivery box, a refrigerator, or the like. In the illustrated embodiment, the electronic device 200 is a mobile phone.

The electronic device 200 includes the weighing device 100, a display screen 21, a motherboard 22, and a rear cover 23. The display screen 21 and the rear cover 23 cooperatively define a receiving space for receiving the weighing device 100 and a motherboard 22. The electronic device 200 further includes other components not described herein.

Figure 2:
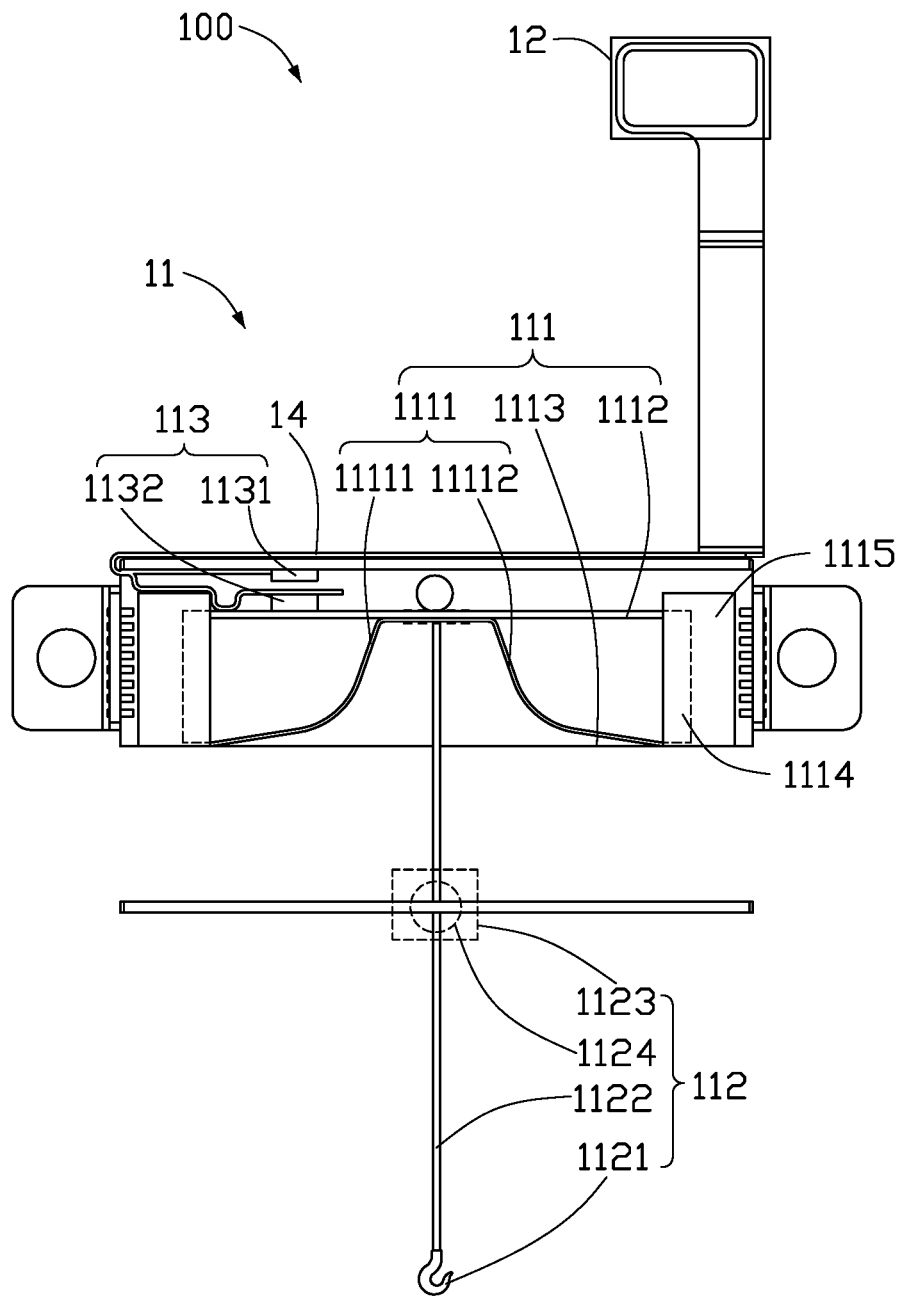
FIG. 2 is a diagram of a weighing module of the weighing device in a natural state.

Referring to FIG. 2, the weighing device 100 includes a weighing module 11, a processor 12, an output device 13, and a case 14. The weighing module 11 includes a deformation component 111, a suspension component 112, and a sensor 113.

The deformation component 111 includes an elastic piece 1111, a connecting portion 1112, and a fixing portion 1113. One end of the elastic piece 1111 is coupled to the connecting portion 1112, and a second end of the elastic piece 1111 is fixed to the fixing portion 1113.

In one embodiment, the elastic piece 1111 includes a first elastic piece 11111 and a second elastic piece 11112. The first elastic piece 11111, the second elastic piece 11112, the connecting portion 1112, and the fixing portion 1113 form an isosceles trapezoid having a circular arc shape on both sides. Two ends of the connecting portion 1112 are respectively movably coupled to a guide rail 1114 of the supporting portion 1115. A material, thickness, length, and width of the first elastic piece 11111 and the second elastic piece 11112 are the same.

The elastic piece 1111 is integrally formed, and two ends of the elastic piece 1111 are fixed to the fixing portion 1113.

The suspension component 112 includes a hook 1121 and a lanyard 1122. In one embodiment, the suspension component 112 further includes a winder 1123, and the lanyard 1122 is wound on a rotary shaft 1124 of the winder 1123. The hook 1121 and the lanyard 1122 can be housed inside the electronic device 200 through the winder 1123. One end of the lanyard 1122 is fixed at a midpoint of the connecting portion 1112, and a second end of the lanyard 1122 is connected to the hook 1121 through the fixing portion 1113.

The sensor 113 may be a distance sensor for detecting a deformation amount of the elastic piece 1111 when the elastic piece 1111 is elastically deformed. In one embodiment, the weighing device 100 is received in a case 14. The sensor 113 includes a first sensor 1131 and a second sensor 1132. The first sensor 1131 is located inside a top of the case 14. The second sensor 1132 is located outside a top of the connecting portion 1112. The second sensor 1132 is opposite to the first sensor 1131 and moves along with the connecting portion 1112. When the elastic piece 1111 is in a natural state and the second sensor 1132 is in a zero point state, the first sensor 1131 emits infrared light, and the second sensor 1132 receives the infrared light. In other embodiments, the sensor 113 may be other types of sensors, such as optical distance sensors, ultrasonic sensors, or the like.

The processor 12 calculates a weight of an object to be weighed according to the deformation amount of the elastic piece 1111 detected by the sensor 113. In one embodiment, the processor 12 may be a processor of the electronic device 200, such as a central processing unit, or may be a separate processor, such as a microprocessor.

The output device 13 outputs the weight of the object. The output device 13 can be a display screen 21. In one embodiment, the output device 13 is located on a rear display screen 131 of the electronic device 200 and located on the rear cover 23. In another embodiment, the output device 13 may be a speaker 132.

Figure 3:
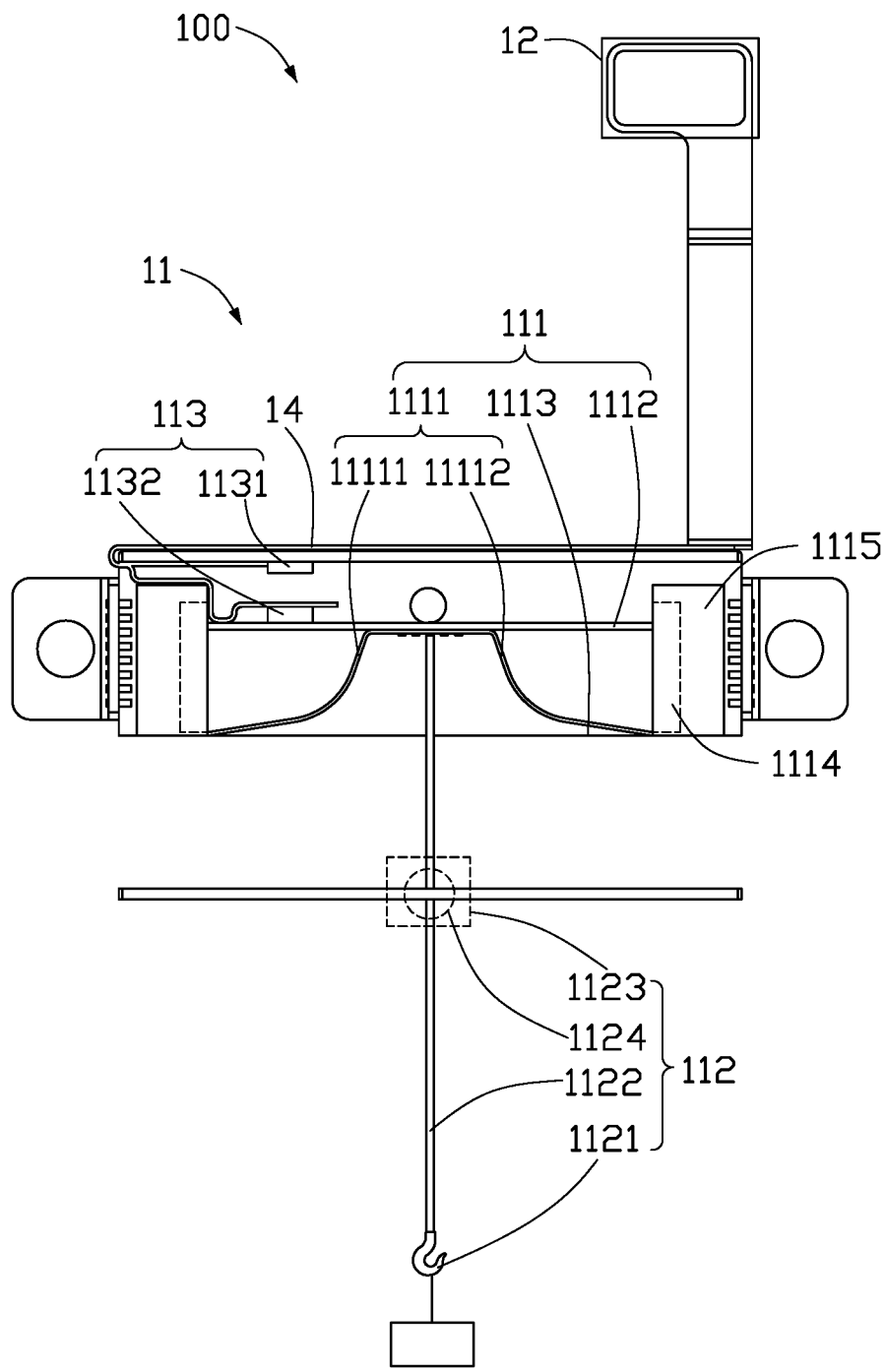
FIG. 3 is a diagram of the weighing module of the weighing device in a state of use.

FIG. 3 shows the object suspended on the hook 1121. When the object to be weighed is suspended on the hook 1121, the lanyard 1122 drives the connecting portion 1112 to slide downward along the rail 1114, thereby causing the elastic piece 1111 to elastically deform, and the second sensor 1132 moves along with the connecting portion 1112. When the second sensor 1132 is in the zero point state, the processor 12 obtains a first time difference between the first sensor 1131 emitting the infrared light and the second sensor 1132 receiving the infrared light. When the second sensor 1132 moves along with the connecting portion 1112, the processor 12 obtains a second time difference between the first sensor 1131 emitting the infrared light and the second sensor 1132 receiving the infrared light. The processor 12 calculates a difference between the second time difference and the first time difference to obtain a relative displacement of the elastic piece 1111. The relative displacement is the deformation amount of the elastic piece 1111. The processor 12 calculates the weight of the object according to the formula M=KX/g. K is the elastic coefficient of the elastic piece 1111. The elastic coefficient 1111 is pre-stored in the processor 12. X is the deformation amount. g is a ratio of gravity to mass. The processor 12 displays the weight on the rear display screen 131. The weight can also be broadcasted by the speaker 132 or displayed on the display screen 21 of the electronic device 200.

In one embodiment, the electronic device 200 may be an electronic delivery box, and the weighing device 100 is located in the electronic delivery box adjacent to a door of the electronic delivery box. When the door is opened, the hook 1121 and the lanyard 1122 extend below the door. The object to be weighed can be suspended on the hook 1121 to be weighed. The output device 13 may be a speaker or an electronic display on the door of the electronic delivery box.

In another embodiment, the electronic device 200 may be a refrigerator, and the weighing device 100 is located adjacent to a door of the refrigerator inside the refrigerator. When the refrigerator door is opened, the hook 1121 and the lanyard 1122 extend below the refrigerator door, and the object to be weighed is suspended on the hook 1121 to be weighed. The output device 13 may be a speaker of the refrigerator or an electronic display on the door of the refrigerator.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A weighing device comprising:
   a weighing module;
   a processor; and
   an output device; wherein:
   the weighing module comprises a suspension component, a deformation component, and a sensor;
   the deformation component comprises an elastic piece, a connecting portion, and a fixing portion;
   the elastic piece is coupled between the connecting portion and the fixing portion, the elastic piece is integrally formed; and two ends of the elastic piece are fixed to the fixing portion;
   the suspension component comprises a hook and a lanyard;
   one end of the lanyard is fixed to the connecting portion, and a second end of the lanyard is passed through the fixing portion and coupled to the hook;
   the hook suspends an object to be weighed;
   when the hook suspends an object to be weighed, the hook moves the connecting portion toward the fixing portion and deforms the elastic piece, the sensor detects a deformation amount of the elastic piece, the processor calculates a weight of the object according to the deformation amount and an elastic coefficient of the elastic piece; and
   the processor outputs the weight through the output device.

2. The weighing device of claim 1, wherein:
   the elastic piece comprises a first elastic piece and a second elastic piece;
   one end of the first elastic piece and one end of the second elastic piece are coupled to the connecting portion;
   a second end of the first elastic piece and a second end of the second elastic piece are fixed to the fixing portion;
   the first elastic piece, the second elastic piece, the connecting portion, and the fixing portion form an isosceles trapezoid having a circular arc shape on both sides;
   a material, thickness, length, and width of the first elastic piece and the second elastic piece are the same.

3. The weighing device of claim 2, wherein two ends of the connecting portion slide within two supporting portions each comprising a rail.

4. The weighing device of claim 1, wherein:
   the sensor comprises a first sensor and a second sensor;
   the first sensor is located on a top portion of the weighing device;
   the second sensor is located on the connecting portion;
   the second sensor is opposite to the first sensor and moves along with the connecting portion;
   in a natural state of the elastic piece and a zero-point state of the second sensor, the first sensor emits infrared light, the second sensor receives the infrared light, the processor obtains a first time difference between the first sensor emitting the infrared light and the second sensor receiving the infrared light;
   the processor obtains a second time difference between the first sensor emitting the infrared light and the second sensor receiving the infrared light after the elastic piece is moved;
   the processor calculates a relative movement according to the first time difference and the second time difference; and
   the relative movement is the deformation amount of the elastic piece.

5. The weighing device of claim 4, wherein:
   after the processor obtains the deformation amount, the processor calculates the weight of the object according to the formula M=KX/g, wherein K is the elastic coefficient of the elastic piece, X is the deformation amount of the elastic piece detected by the sensor, and g is a ratio of gravity to mass; and
   K is pre-stored in the processor.

6. The weighing device of claim 1, wherein:
   the suspension component comprises a winder;
   the winder winds the lanyard around a rotary shaft.

7. The weighing device of claim 1, wherein the output device is a display screen or a speaker.

8. An electronic device comprising a weighing device, the weighing device comprising:
   a weighing module;
   a processor; and
   an output device; wherein:
   the weighing module comprises a suspension component, a deformation component, and a sensor;
   the deformation component comprises an elastic piece, a connecting portion, and a fixing portion;

the elastic piece is coupled between the connecting portion and the fixing portion, the elastic piece is integrally formed; and two ends of the elastic piece are fixed to the fixing portion;

the suspension component comprises a hook and a lanyard;

one end of the lanyard is fixed to the connecting portion, and a second end of the lanyard is passed through the fixing portion and coupled to the hook;

the hook suspends an object to be weighed;

when the hook suspends an object to be weighed, the hook moves the connecting portion toward the fixing portion and deforms the elastic piece, the sensor detects a deformation amount of the elastic piece, the processor calculates a weight of the object according to the deformation amount and an elastic coefficient of the elastic piece; and the processor outputs the weight through the output device.

9. The electronic device of claim 8, wherein:
the elastic piece comprises a first elastic piece and a second elastic piece;
one end of the first elastic piece and one end of the second elastic piece are coupled to the connecting portion;
a second end of the first elastic piece and a second end of the second elastic piece are fixed to the fixing portion;
the first elastic piece, the second elastic piece, the connecting portion, and the fixing portion form an isosceles trapezoid having a circular arc shape on both sides;
a material, thickness, length, and width of the first elastic piece and the second elastic piece are the same.

10. The electronic device of claim 9, wherein two ends of the connecting portion slide within two supporting portions each comprising a rail.

11. The electronic device of claim 8, wherein:
the sensor comprises a first sensor and a second sensor;
the first sensor is located on a top portion of the weighing device;
the second sensor is located on the connecting portion;
the second sensor is opposite to the first sensor and moves along with the connecting portion;
in a natural state of the elastic piece and a zero-point state of the second sensor, the first sensor emits infrared light, the second sensor receives the infrared light, the processor obtains a first time difference between the first sensor emitting the infrared light and the second sensor receiving the infrared light;
the processor obtains a second time difference between the first sensor emitting the infrared light and the second sensor receiving the infrared light after the elastic piece is moved;
the processor calculates a relative movement according to the first time difference and the second time difference; and
the relative movement is the deformation amount of the elastic piece.

12. The electronic device of claim 11, wherein:
after the processor obtains the deformation amount, the processor calculates the weight of the object according to the formula $M=KX/g$, wherein K is the elastic coefficient of the elastic piece, X is the deformation amount of the elastic piece detected by the sensor, and g is a ratio of gravity to mass; and
K is pre-stored in the processor.

13. The electronic device of claim 8, wherein:
the suspension component comprises a winder;
the winder winds the lanyard around a rotary shaft.

14. The electronic device of claim 8, wherein the output device is a display screen or a speaker.

* * * * *